US007772566B2

(12) United States Patent
Lee

(10) Patent No.: US 7,772,566 B2
(45) Date of Patent: Aug. 10, 2010

(54) POWER SAVING TYPE SAFE DRINKING WATER DISCHARGE DEVICE

(75) Inventor: Yoen Seok Lee, Gyeonggi-do (KR)

(73) Assignee: Banpo Distribution Co., Ltd., Hanam Si (KR)

( * ) Notice: Subject to any disclaimer, the term of this patent is extended or adjusted under 35 U.S.C. 154(b) by 0 days.

(21) Appl. No.: 12/451,610

(22) PCT Filed: Nov. 6, 2008

(86) PCT No.: PCT/KR2008/006540

§ 371 (c)(1),
(2), (4) Date: Nov. 20, 2009

(87) PCT Pub. No.: WO2009/061137

PCT Pub. Date: May 14, 2009

(65) Prior Publication Data

US 2010/0126943 A1 May 27, 2010

(30) Foreign Application Priority Data

Nov. 9, 2007 (KR) ...................... 10-2007-0114557
Jul. 8, 2008 (KR) ...................... 10-2008-0065936

(51) Int. Cl.
*C02F 1/32* (2006.01)

(52) U.S. Cl. ........................ 250/436; 250/428; 250/429; 250/432 R; 250/504 R; 222/146.6; 210/748.1; 422/24

(58) Field of Classification Search ................. 250/428, 250/429, 432 R, 436, 504 R; 222/146.6; 210/748.1; 422/24
See application file for complete search history.

(56) References Cited

U.S. PATENT DOCUMENTS 4,757,921 A * 7/1988 Snowball ................. 222/146.6
6,469,308 B1 * 10/2002 Reed .......................... 250/436

FOREIGN PATENT DOCUMENTS

WO WO 0038814 A1 * 7/2000

* cited by examiner

*Primary Examiner*—Robert Kim
*Assistant Examiner*—Michael Maskell
(74) *Attorney, Agent, or Firm*—The Nath Law Group

(57) ABSTRACT

Disclosed is a power-saving type safe drinking water discharge device to treat cold water from a cooling reservoir (110), in which water is temporarily stored and cooled, prior to discharging the water to the outside through a tap valve (120). A connecting tube (10), provided around an outer circumference thereof with a coolant tube (40), is provided between the cooling reservoir and the tap valve, such that the water, which is primarily cooled to a predetermined temperature in the cooling reservoir, is secondarily cooled while passing through the connecting tube, prior to being discharged through the tap valve. The discharge device is used to sterilize and cool water in a public or domestic drinking water appliance, thereby minimizing contamination of water and allowing a user to always drink cold water.

7 Claims, 6 Drawing Sheets

[Fig. 1]
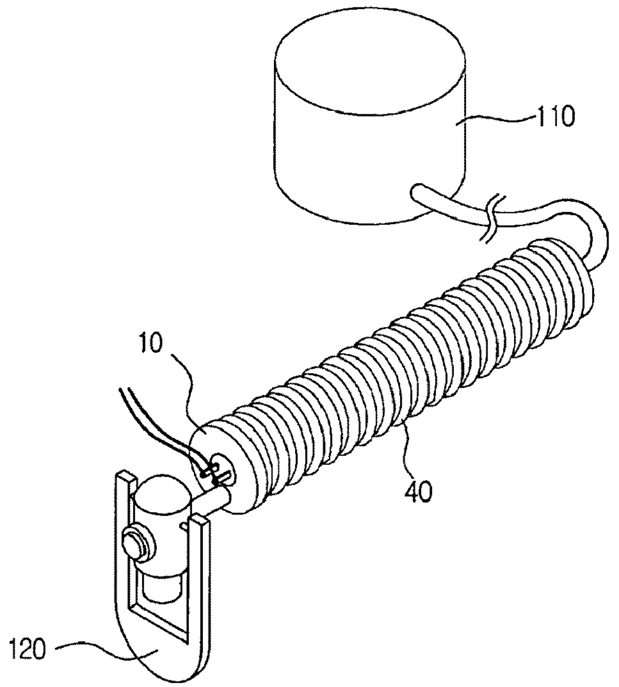
[Fig. 2]
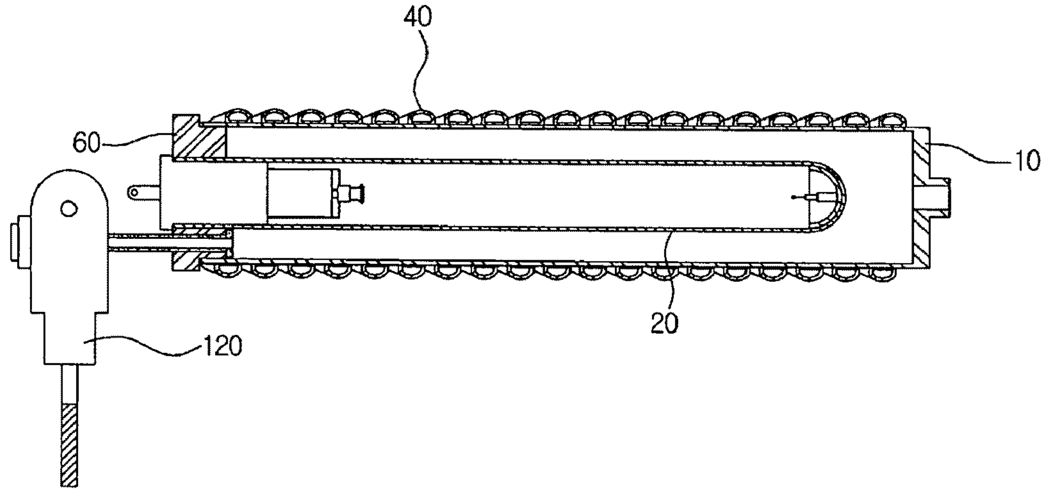

[Fig. 3]
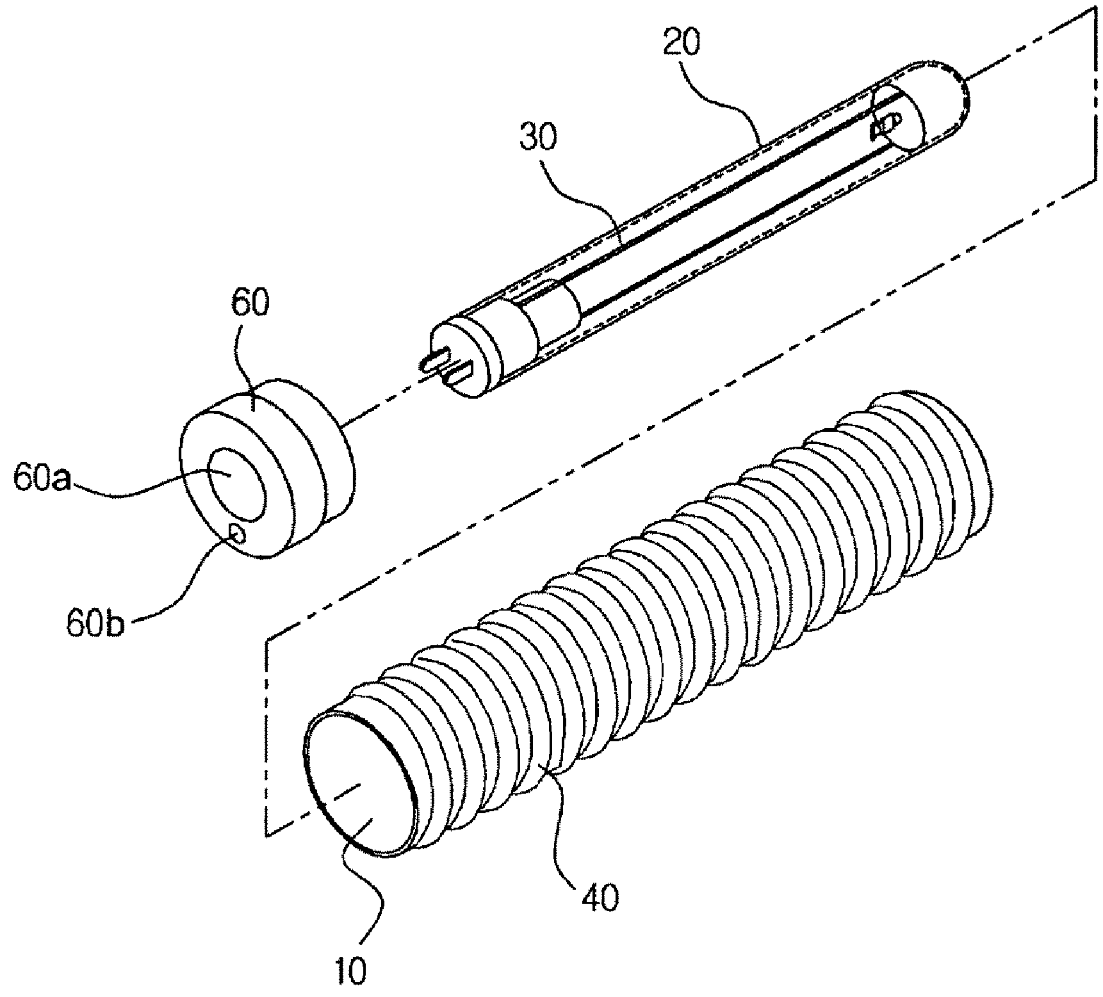

[Fig. 4]
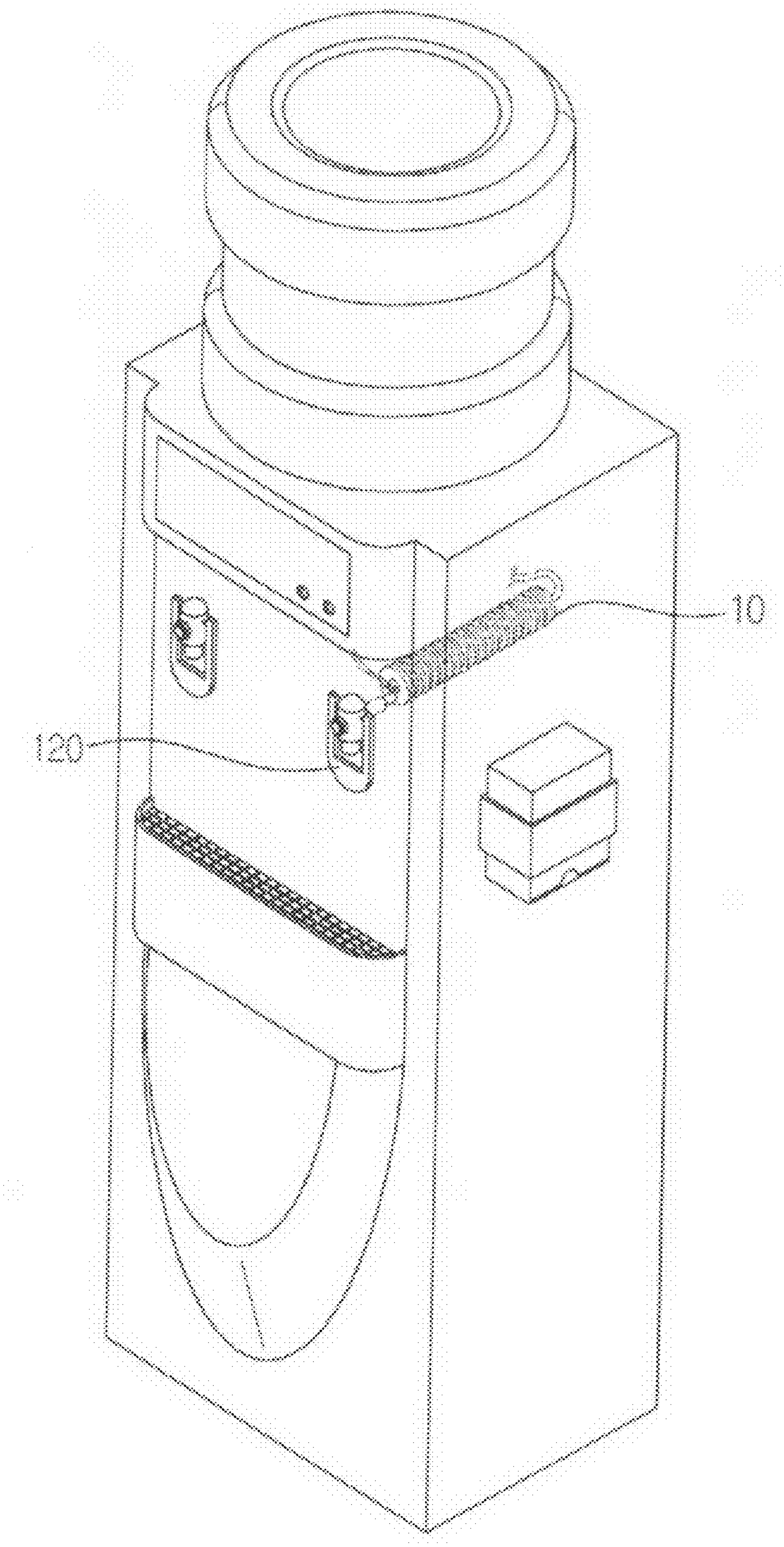

[Fig. 5]
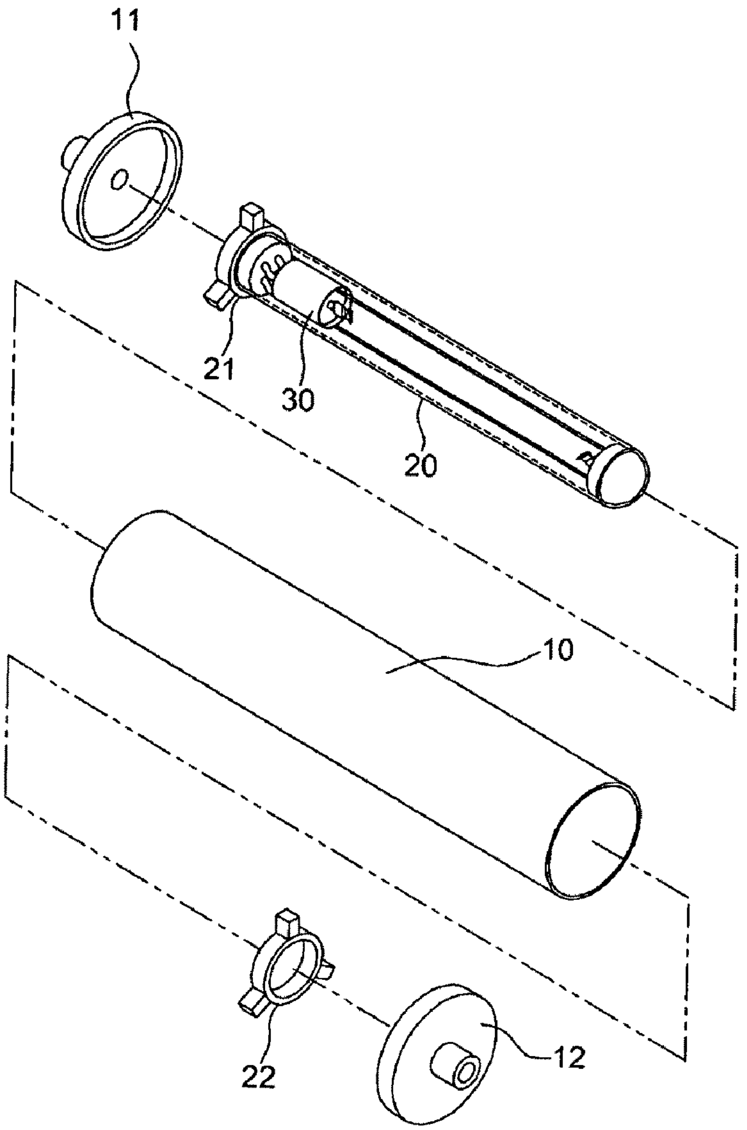
[Fig. 6]
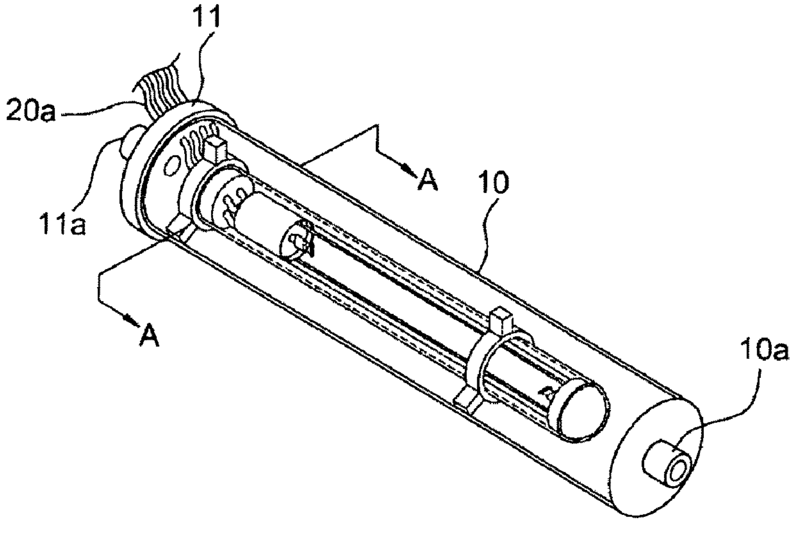

[Fig. 7]
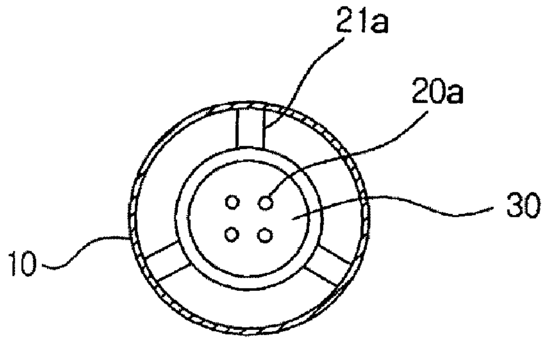
[Fig. 8]
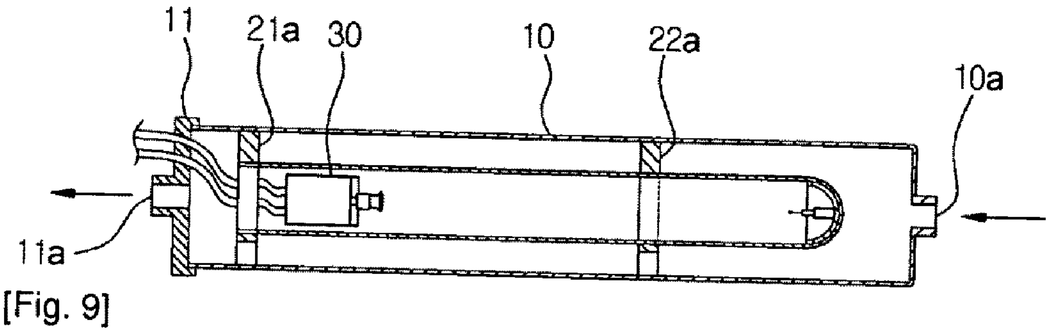
[Fig. 9]
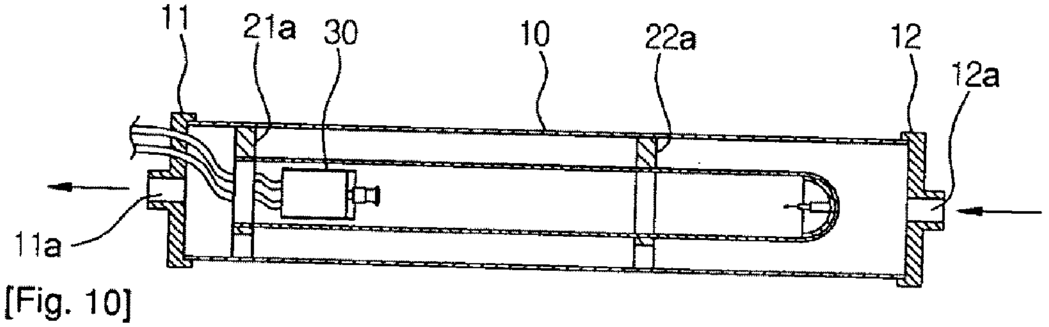
[Fig. 10]
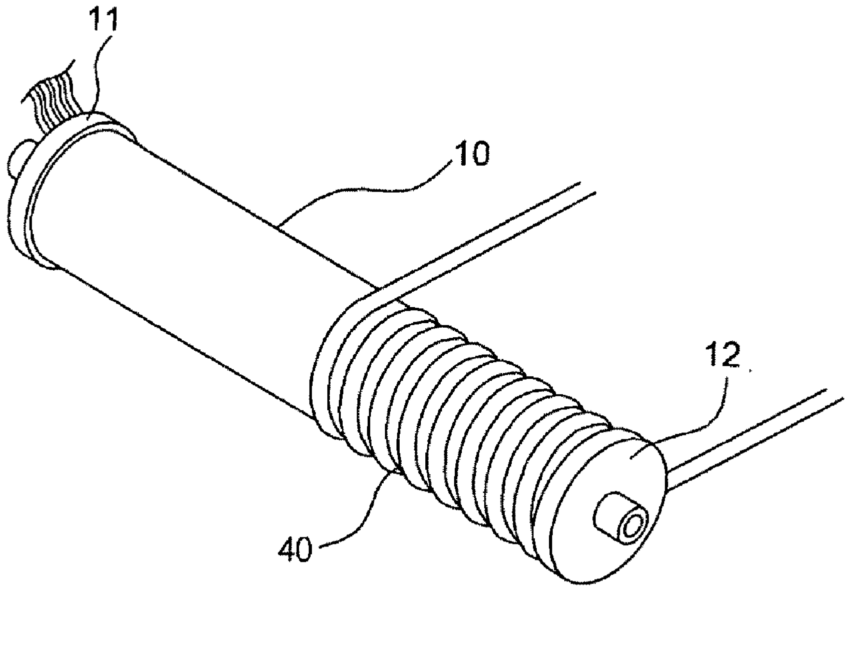

[Fig. 11]
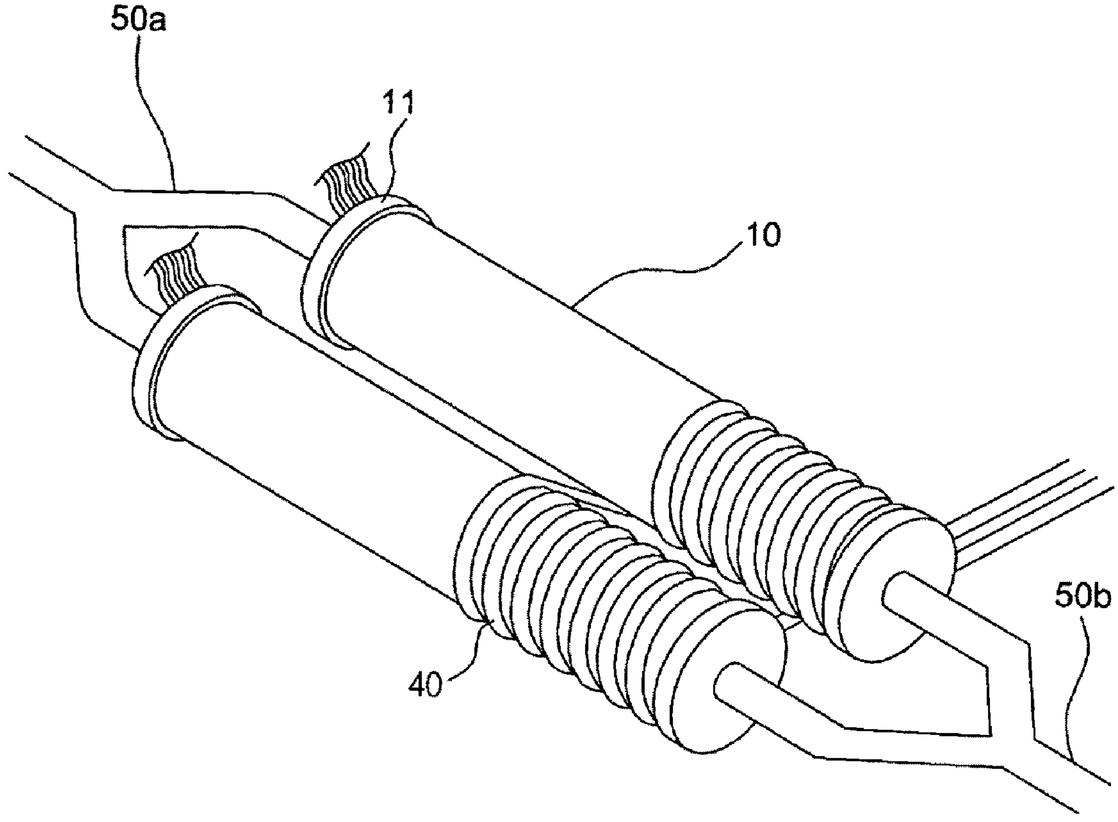

POWER SAVING TYPE SAFE DRINKING WATER DISCHARGE DEVICE

This is a U.S. national phase Application filed under 35 U.S.C. 371 of PCT/KR2008/006540 A1, filed 06 Nov. 2008 claiming priority benefit from KR Application No.(s) 10-2007-0114557, filed 09 Nov. 2007 and No. 10-2008-0065936, filed 08 Jul. 8, 2008, the entire content of which is hereby incorporated.

TECHNICAL FIELD

The present invention relates to a power-saving type safe drinking water discharge device to assure safe drinking of sterilized cold water from a drinking water appliance and an installation method thereof.

BACKGROUND ART

The present invention provides a power-saving type safe drinking water discharge device, which is used to sterilize and cool water in a public or domestic drinking water appliance, thereby minimizing contamination of unboiled water and allowing a user to always drink unboiled cold water, and an installation method thereof.

Generally, a water purifier or hot/cold water dispenser, as a drinking water appliance to discharge sterilized cold tap water or unboiled water, is designed such that an unboiled water container is put thereon, or such that water is primarily purified in a purifying system incorporated therein and then, is temporarily stored and cooled to a preset temperature in a cooling reservoir therein.

The above-described purifying system generally includes a filtering device, ultraviolet processor or ozone processor, and the like. After removing contaminants from water using a filter, the water is sterilized and purified using a sterilizing lamp tube or quartz tube provided with an ultraviolet lamp.

Specifically, in the water purifier or hot/cold water dispenser, after the filter removes contaminants from water to be introduced into an inlet of a water vessel, the water is directed from the filter to the ultraviolet lamp through an entrance of the sterilizing lamp tube such that ultraviolet rays emitted from the ultraviolet lamp are concentrated on the water to sterilize the water. However, the water stays around the ultraviolet lamp only for a short time, having a risk of insufficient sterilization.

DISCLOSURE OF INVENTION

Technical Problem

Therefore, the above-described type of conventional unboiled water sterilizing device having an ultraviolet lamp to sterilize unboiled water so as to remove bacteria has a problem in that discharge of unboiled water sterilized by the ultraviolet lamp requires an excessively long path and time, causing regeneration of bacteria or recontamination of unboiled water if the unboiled water is insufficiently sterilized.

Further, if screws or metallic fasteners are used to connect a quartz tube or sterilizing lamp tube, which protects the ultraviolet lamp for generation of ozone, to an associated connecting tube, after a relatively long time, this may cause oxygen corrosion of the fasteners, resulting in further contamination of unboiled water rather than purification.

Due to the fact that unboiled water to be sterilized has an excessively short contact time with ultraviolet rays emitted from the ultraviolet lamp, there is a risk of insufficient sterilization of unboiled water. Therefore, sufficient sterilization of unboiled water conventionally requires a large-scale sterilizing device having disadvantages of difficult handling and high price.

Furthermore, providing a cooling device to lower a temperature of unboiled water in addition to the sterilizing device disadvantageously increases a product price. When the unboiled water cooling device is installed at a distance from a water discharge tap valve of the appliance, moreover, the cooled unboiled water may be again increased in temperature due to heat from the sterilizing device and the entire appliance.

Technical Solution

In accordance with the present invention, the above and other objects can be accomplished by the provision of a power-saving type safe drinking water discharge device, through which water from a cooling reservoir passes prior to being discharged to the outside through a tap valve, wherein a connecting tube is provided between the cooling reservoir and the tap valve, and a coolant tube is provided around an outer circumference of the connecting tube, whereby water, which is primarily cooled to a predetermined temperature in the cooling reservoir, is secondarily cooled while passing through the connecting tube, prior to being discharged through the tap valve.

Advantageous Effects

A power-saving type safe drinking water discharge device according to the present invention has the following effects.

Firstly, a coolant tube is wound on a connecting tube, to directly provide a user with cooled unboiled water, achieving pleasant drinking of cold water and reduced electricity consumption.

Secondly, a sterilizing lamp tube is secured in the connecting tube using a silicone cap member and fixing ring, eliminating a risk of corrosion of the cap member. Using the anti-corrosion cap member has the effects of preventing contamination of unboiled water in the connecting tube and inhibiting growth of bacteria.

Thirdly, a serial connection between the connecting tube and an unboiled water discharge tap valve is accomplished within an appliance, allowing unboiled water to be discharged from the appliance immediately after being sterilized, and preventing growth and propagation of bacteria.

Fourthly, as a result of irradiating concentrated ultraviolet rays from the sterilizing lamp tube to the unboiled water, which flows from one end of the connecting tube, as an entrance, to the other end of the connecting tube, as an exit, for a sufficient time, healthy, sterilized unboiled water can be obtained.

Fifthly, with wing pieces and fixing pieces formed at outer circumferences of the cap member and fixing ring, the sterilizing lamp can be stably secured in the connecting tube without a risk of unwanted movement and damage thereof. Further, as the water flows between the wing pieces and fixing pieces, the flow rate and direction of water can be controlled.

Sixthly, caps are fastened to both the ends of the connecting tube, resulting in an improvement in manual operating efficiency.

Seventhly, when the power-saving type safe drinking water discharge device includes a plurality of connecting tubes connected in parallel using a branching tube and a converging tube, a great amount of unboiled water from the connecting tubes can be sterilized and cooled simultaneously.

BRIEF DESCRIPTION OF THE DRAWINGS

The above and other objects, features, and other advantages of the present invention will be more clearly understood from the following detailed description taken in conjunction with the accompanying drawings, in which:

FIG. 1 is a diagrammatic perspective view of a power-saving type safe drinking water discharge device according to the present invention;

FIG. 2 is a sectional view of a connecting tube provided in the power-saving type safe drinking water discharge device according to the present invention;

FIG. 3 is an exploded perspective view of the connecting tube containing a sterilizing lamp tube;

FIG. 4 is a perspective view illustrating a use example of the power-saving type safe drinking water discharge device according to the present invention;

FIGS. 5 to 9 are, respectively, an exploded perspective view, a perspective view, a cross sectional view and a longitudinal sectional view illustrating another embodiment of the power-saving type safe drinking water discharge device according to the present invention; and FIGS. 10 and 11 are diagrammatic perspective views illustrating an installation method of the power-saving type safe drinking water discharge device according to the present invention, which is used to cool and sterilize a great amount of water.

BEST MODE FOR CARRYING OUT THE INVENTION

The present invention provides a power-saving type safe drinking water discharge device wherein water in a public or domestic drinking water appliance is sterilized and cooled to minimize contamination of water and wherein purified water is again sterilized and cooled immediately prior to being discharged from the appliance via a shortest discharge path in the appliance without a risk of increase in temperature of the cooled water caused when the water is exposed to internal heat for a long time while passing through a discharge hose or tube.

In the above-described power-saving type safe drinking water discharge device, at least two connecting tubes are connected in parallel between a branching tube connected to a cooling reservoir and a converging tube connected to a tap valve.

Hereinafter, exemplary embodiments of the power-saving type safe drinking water discharge device according to the present invention will be described in detail with reference to the accompanying drawings.

FIGS. 1 to 4 are, respectively, a diagrammatic perspective view, an inner sectional view, an exploded perspective view and a perspective view illustrating a power-saving type safe drinking water discharge device according to one exemplary embodiment of the present invention.

Generally, the power-saving type safe drinking water discharge device serves to sterilize and cool tap water in public places or at home so as to provide safe drinking water, and is used in a water purifier, unboiled water dispenser, cold/hot water dispenser, and the like. In the present invention, the power-saving type safe drinking water discharge device is used in a purifier comprising: a purifying device to filter and remove contaminants from tap water or unboiled water; and a cooling reservoir 110 in which the water purified by the purifying device is temporarily stored and cooled to a certain temperature. After the purified water, having passed through the purifying device, is cooled to a certain temperature and temporarily stored in the cooling reservoir 110, the purified cold water is discharged to the outside via a tap valve 120.

The power-saving type safe drinking water discharge device according to the present invention includes a connecting tube 10 provided between the cooling reservoir 110 and the tap valve 120. The connecting tube 10 is preferably connected to an entrance end of the tap valve 120 such that the interior of the connecting tube 10 is in communication with the tap valve 120. In addition, a coolant tube 40, through which a coolant flows, is provided around an outer circumference of the connecting tube 10.

The connecting tube 10 may be made of a stainless metal having outstanding heat-transfer and anti-corrosion characteristics. The shape of the connecting tube 10 may be selected from various shapes including circular, triangular, square and hexagonal cross sections. In particular, when the connecting tube 10 has a cylindrical shape, it is possible to assure efficient flow of water and to maintain a constant reflection angle of ultraviolet rays irradiated from a sterilizing lamp tube that will be described hereinafter so as to sterilize water passing through the connecting tube 10.

The coolant tube 40, provided around the outer circumference of the connecting tube 10, is wound tightly around the outer circumference of the connecting tube 10, to achieve heat balance between the interior temperature of the connecting tube 10 and the temperature of the coolant tube 40. Accordingly, after water in the connecting tube 10 is cooled to a temperature of the coolant tube 40, the cooled water is directly discharged to the outside via the tap valve 120.

Specifically, in the power-saving type safe drinking water discharge device according to the present embodiment, the water, which is primarily cooled in the cooling reservoir 110, is secondarily cooled while passing through the connecting tube 10, around which the coolant tube 40 is wound, prior to being discharged out of the purifier, whereby a user can drink cooled water having the same temperature as a preset cooling temperature of the safe drinking water discharge device.

The power-saving type safe drinking water discharge device according to the present embodiment, as shown in FIGS. 2 and 3, further includes a sterilizing lamp tube 20 received in the connecting tube 10 and having an UltraViolet (UV) lamp 30 or Light Emitting Diode (LED) lamp. The sterilizing lamp tube 20 irradiates ultraviolet rays to the water passing through the connecting tube 10, to sterilize and remove bacteria contained in the water.

The sterilizing lamp tube 20 is secured in the connecting tube 10 by use of a packing member 60. The packing member 60 is fastened to one end of the connecting tube 10 and has a center fastening opening 60*a* into which one end of the sterilizing lamp tube 20 is fastened. The packing member 60 further has a drainage hole 60*b* at a predetermined distance from the fastening opening 60*a* to allow the water, introduced into the connecting tube 10, to be drained to the tap valve 120 through the drainage hole 60*b*.

Specifically, after the sterilizing lamp tube 20, which is fastened at one end thereof to the packing member 60, is inserted into the connecting tube 10, the packing member 60 is fastened to the end of the connecting tube 10, allowing the sterilizing lamp tube 20 to be secured in the connecting tube 10.

FIGS. 5 to 9 illustrate another embodiment of the power-saving type safe drinking water discharge device according to the present invention. In the present embodiment, the connecting tube 10 is provided, at one end thereof, with an outwardly protruding suction bore 10*a* having an outer diameter slightly smaller than a diameter of a hose connected to the cooling reservoir 110, and the other end of the connecting tube 10 is fastened with a discharge cap 11 having a center discharge hole 11*a*, through which the water, suctioned into the connecting tube 10 through the suction bore 10*a*, is discharged. That is, the water is introduced into the connecting tube 10 through the suction bore 10*a*, and is discharged to the tap valve 120 through the discharge hole 11*a*.

To assure easy manual fastening/unfastening of the discharge cap 11, the connecting tube 10 may be formed, at an outer circumference of the other end thereof, with spiral threads (not shown). As occasion demands, the discharge cap 11 is made of silicone or cork and is interference-fitted into the other end of the connecting tube 10.

The discharge cap 11, fastened to the connecting tube 10, is useful when it is desired to open the connecting tube 10 for exchange and washing of the sterilizing lamp tube 20.

The sterilizing lamp tube 20 is provided in the connecting tube 10, through which the water from the cooling reservoir 110 passes, and is used to sterilize the water temporarily present in the connecting tube 10 so as to provide safe drinking water. The sterilizing lamp tube 20 is a quartz tube made of high-durability quartz in a hermetic manner, and takes the form of a hermetic cylinder having one open end and the other streamlined closed end. The sterilizing lamp tube 20 receives the UV lamp 30 having electric wires 20*a* extended from respective terminals for sterilizing water via irradiation of ultraviolet rays and as occasion demands, the UV lamp 30 may be replaced with an LED lamp.

Generally, the UV lamp 30 has a semi-permanent lifespan of about 8,000 hours together with a contaminant removal filter, and the LED lamp has a lifespan of about 20,000 hours.

The UV lamp 30 is provided, at opposite ends thereof, with electrodes. After a power line is connected to the electrode at one end of the UV lamp 30, a connecting cap, which is made of rubber for preventing leakage of current, is covered over the electrode. The electrode at the other end of the UV lamp 30 is connected to a power terminal of a socket and is covered with a semi-spherical silicon cap for preventing damage to the UV lamp 30. In addition, to visually confirm the operating condition of the UV lamp 30 from the outside of the purifier 100, an LED display window 130 is provided at a front surface of the body of the purifier 100.

The sterilizing lamp tube 20 has a longer length than a length of the UV lamp 30 and encloses the UV lamp 30 to protect the UV lamp 30. The normal operation/malfunction of the UV lamp 30 can be confirmed via the exterior LED display window 130.

The streamlined end of the sterilizing lamp tube 20 allows the water, suctioned through the suction bore 10*a*, to flow toward the discharge hole 11*a* at a high speed under the influence of minimum friction against the sterilizing lamp tube 20.

As shown in FIGS. 5 to 7, a silicone cap member 21, which substantially has no risk of growth of bacteria and generation of fine pores, is fitted on the open end of the sterilizing lamp tube 20, to hermetically seal the sterilizing lamp tube 20. Thereby, the interior of the sterilizing lamp tube 20 is kept at a vacuum pressure.

The electric wires 20*a* from the UV lamp 30 are interference fitted through the body of the cap member 21 and the discharge cap 11, to prevent outside water or air from permeating into the sterilizing lamp tube 20. At least two, preferably, three or four wing pieces 21*a* radially protrude from an outer circumference of the body of the cap member 21 with a predetermined angular interval therebetween.

Specifically, when the cap member 21 is fitted on the sterilizing lamp tube 20, the wing pieces 21*a* of the cap member 21 are caught by the open end of the sterilizing lamp 20. Thereby, only the body of the cap member 21 is fitted into the sterilizing lamp tube 20 and the wing pieces 21*a* protrude outward from the sterilizing lamp tube 20.

Accordingly, the sterilizing lamp tube 20, provided in the connecting tube 10, can be secured in the connecting tube 10 as the wing pieces 21*a* of the cap member 21 come into close contact with an inner circumference of the connecting tube 10. The wing pieces 21*a* of the cap member 21 further serve to assure a constant flow rate of water between the respective neighboring wing pieces 21*a*.

FIGS. 8 and 9 are sectional views illustrating the interior of the connecting tube 10. The water, introduced through the suction bore 10*a* of the connecting tube 10, stays in the connecting tube 10 for a predetermined time. In this case, the UV lamp 30 or LED lamp provided in the sterilizing lamp tube 20 irradiates ultraviolet rays to the water so as to sterilize the water. The sterilized water is drained out of the connecting tube 10 through the discharge hole 11*a*.

In the above-described power-saving type safe drinking water discharge device, to prevent the sterilizing lamp tube 20 from being moved in the connecting tube 10 when the water is introduced into the suction bore 10*a* at a high flow rate, a fixing ring 22 is fitted around the sterilizing lamp tube 20 at a position near the other end of the sterilizing lamp tube 20. The fixing ring 22 has at least two fixing pieces 22*a* protruding radially from an outer circumference of the fixing ring 22 to come into close contact with the inner circumference of the connecting tube 10.

Specifically, the sterilizing lamp tube 20 is balanced and secured in the connecting tube 10 by use of the cap member 21 and the fixing ring 22. This prevents the sterilizing lamp tube 20 from being easily moved and damaged in the connecting tube 10 by the flow rate of water.

As shown in FIG. 10, in the power-saving type safe drinking water discharge device according to the present embodiment, to achieve improved water cooling effects, the connecting tube 10 is made of a stainless metal having outstanding heat-transfer characteristics and the coolant tube 40 is provided around the outer circumference of the connecting tube 10. More preferably, the coolant tube 40 is wound from the center of the outer circumference of the connecting tube 10 to the fastening position of the discharge cap 11, to allow the water, cooled by the coolant tube 40, to be discharged out of the connecting tube 10 via a shortest path. Providing the cooled water eliminates unpleasantness caused upon drinking of tepid water when the cooled purified water is exposed to internal heat for a long time as it is discharged through a conventional hose or tube.

A suction cap 12 having an outwardly protruding center suction bore 12*a* is fastened to the suction bore 10*a* of the connecting tube 10. Fastening the discharge cap 11 and suction cap 12 to opposite ends of the cylindrical connecting tube 10 provides convenience in exchange of the sterilizing lamp tube 20 and ultraviolet lamp 30. Further, by freely adjusting radii of the discharge hole 11*a* and suction bore 12*a*, the suction/discharge amount of water can be appropriately adjusted.

Now, cooling efficiency per watt of the power-saving type safe drinking water discharge device according to the present invention will be compared with a conventional tap water purifier. On the basis of consumption electricity when a cooling reservoir of the conventional tap water purifier is operated to maintain water of about 3.8 liters at a constant temperature of 3° C., the power-saving type safe drinking water discharge device according to the present invention can achieve electricity saving effect of about 50% when the cooling reservoir 110 is operated to maintain the same amount of water at a constant temperature of 6° C. and the temperature of water is instantaneously lowered to 3° C. or less while passing through the connecting tube 10 provided with the coolant tube 40.

As shown in FIG. 11, the power-saving type safe drinking water discharge device according to the present invention serves to safely sterilize and cool a great amount of unboiled water at a high speed with minimum electricity consumption. For this, the tap valve 120 to drain the water is connected to one end of a converging tube 50*a* and the other end of the converging tube 50*a* is connected with at least two connecting tubes 10. In this case, the suction bores 12*a* of the connecting tubes 10 are connected with a branching tube 50*b*.

Specifically, there are provided two or more connecting tubes 10 each having the sterilizing lamp tube 20, and the Y-shaped converging tube 50*a* and Y-shaped branching tube 50*b* are connected in parallel with the discharge holes 11*a* and suction bores 12*a* of the connecting tubes 10. With this configuration, the water, having passed through the branching tube 50*b*, is introduced into the connecting tubes 10 through the suction bores 12*a*, and then, is discharged from the discharge holes 11*a* after being sterilized and cooled in the connecting tubes 10 by the UV lamps 30 of the sterilizing lamp tubes 20 and the coolant tubes 40. Thereafter, the water, discharged from the discharge holes 11*a*, is drained out of the tap valve 120 through the converging tube 50*a* connected with the discharge holes 11*a*.

Accordingly, when it is desired to sterilize and cool a great amount of unboiled water, the branching tube 50*b* and converging tube 50*a* may be connected with a plurality of connecting tubes 10 so as to simultaneously sterilize and cool water from the connecting tubes 10.

Although the preferred embodiments of the present invention have been disclosed for illustrative purposes, those skilled in the art will appreciate that various modifications, additions and substitutions are possible, without departing from the scope and spirit of the invention as disclosed in the accompanying drawings.

INDUSTRIAL APPLICABILITY

In accordance with the present invention, the above and other objects can be accomplished by the provision of a power-saving type safe drinking water discharge device, through which water from a cooling reservoir passes prior to being discharged to the outside through a tap valve, wherein a connecting tube is provided between the cooling reservoir and the tap valve, and a coolant tube is provided around an outer circumference of the connecting tube, whereby water, which is primarily cooled to a predetermined temperature in the cooling reservoir, is secondarily cooled while passing through the connecting tube, prior to being discharged through the tap valve.

When it is desired to sterilize and cool a great amount of unboiled water, the branching tube and converging tube may be connected with a plurality of connecting tubes so as to simultaneously sterilize and cool water from the connecting tubes.

Although the preferred embodiments of the present invention have been disclosed for illustrative purposes, those skilled in the art will appreciate that various modifications, additions and substitutions are possible, without departing from the scope and spirit of the invention as disclosed in the accompanying drawings.

The invention claimed is:

1. A power-saving type safe drinking water discharge device, through which water from a cooling reservoir passes prior to being discharged to the outside through a tap valve, wherein a connecting tube is provided between the cooling reservoir and the tap valve, and a coolant tube is provided around an outer circumference of the connecting tube, whereby water, which is primarily cooled to a predetermined temperature in the cooling reservoir, is secondarily cooled while passing through the connecting tube, prior to being discharged through the tap valve wherein the power-saving type safe drinking water discharge device further comprises:

a discharge cap fastened to one end of the connecting tube and having a discharge hole;

a fixing ring defining a center opening and having at least two fixing pieces radially protruding from an outer circumference thereof so as to fixedly come into close contact with an inner circumference of the connecting tube;

a sterilizing lamp tube fastened through the fixing ring so as to be secured in the connecting tube and containing an ultraviolet lamp connected with an electric wire from an external power source; and a cap member having a body fitted on one end of the sterilizing lamp to hermetically seal the sterilizing lamp tube and at least two wing pieces radially protruding from an outer circumference of the body to come into close contact with the inner circumference of the connecting tube, the electric wire from the ultraviolet lamp being tightly penetrated through the body of the cap member.

2. The device according to claim 1 wherein a packing member, having a fastening opening and a drainage hole, is fastened to one end of the connecting tube, and a sterilizing lamp tube, containing an ultraviolet lamp, is fastened into the fastening opening to thereby be secured in the connecting tube.

3. The device according to claim 1, wherein the electric wire from the sterilizing lamp tube is interference fitted into the discharge cap so as to be discharged out of the connecting tube.

4. The device according to claim 1, wherein at least two of the connecting tubes are connected in parallel between a branching tube connected to the cooling reservoir and a converging tube connected to the tap valve.

5. The device according to claim 2, wherein at least two of the connecting tubes are connected in parallel between a branching tube connected to the cooling reservoir and a converging tube connected to the tap valve.

6. The device according to claim 1, wherein at least two of the connecting tubes are connected in parallel between a branching tube connected to the cooling reservoir and a converging tube connected to the tap valve.

7. The device according to claim 3, wherein at least two of the connecting tubes are connected in parallel between a branching tube connected to the cooling reservoir and a converging tube connected to the tap valve.

* * * * *